United States Patent
Kim (10) Patent No.: US 6,654,093 B1
(45) Date of Patent: Nov. 25, 2003

(54) REFLECTIVE LIQUID CRYSTAL DISPLAY OF TWISTED NEMATIC MODE WITH HIGH REFLECTANCE RATIO

(75) Inventor: Woohyun Kim, Seoul (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/571,276

(22) Filed: May 16, 2000

(30) Foreign Application Priority Data

Jun. 5, 1999 (KR) ........................................ 1999-20861

(51) Int. Cl.$^7$ .................. G02F 1/1335; G02F 1/13
(52) U.S. Cl. ................... 349/179; 349/119; 349/113; 349/180; 349/181; 349/186
(58) Field of Search ................... 349/113, 96–99, 349/117, 119, 179, 186, 180, 181

(56) References Cited

U.S. PATENT DOCUMENTS

| | | | |
|---|---|---|---|
| 4,019,807 A | * | 4/1977 | Boswell et al. ............... 349/25 |
| 5,361,151 A | * | 11/1994 | Sonehara et al. ............. 349/98 |
| 5,619,356 A | * | 4/1997 | Kozo et al. .................... 349/99 |
| RE35,799 E | | 5/1998 | Sonehara et al. |

* cited by examiner

*Primary Examiner*—Julie Ngo
(74) *Attorney, Agent, or Firm*—Birch, Stewart, Kolasch & Birch, LLP (57) ABSTRACT

A reflective liquid crystal display device includes: first and second substrates spaced apart and facing each other; a twisted nematic liquid crystal layer sandwiched between the two substrates, the liquid crystal layer having a twist angle and birefringence property $\Delta n$ and having a thickness d; a retardation film disposed on the first substrate and opposite to the liquid crystal layer, the film converting a first linearly polarized light from above to a first circularly polarized light and converting a second circularly polarized light reflected from below to a second linearly polarized light; a linear polarizer disposed on the retardation film and opposite to the liquid crystal layer and converting the incident light to the first linearly polarized light; and a reflector disposed between the liquid crystal layer and the second substrate and reflecting light passed through the liquid crystal layer. A most desirable range for the twist angle is between above 65° and 75° or 75° and 85° and a most desirable range of a product $d\Delta n$ is between about 0.20 μm and 0.28 μm or 0.18 μm and 0.26 μm. By the invention, light reflectance, contrast ratio and yield can be enhanced.

21 Claims, 7 Drawing Sheets

REFLECTIVE LIQUID CRYSTAL DISPLAY OF TWISTED NEMATIC MODE WITH HIGH REFLECTANCE RATIO

CROSS REFERENCE TO RELATED ART

This application claims the benefit of Korean Patent Application No. 1999 20861, filed on Jun. 5, 1999, which is hereby incorporated by reference.

BACKGROUND OF THE INVENTION

1. Field of the Invention

This invention relates to a reflective liquid crystal display device, more particularly to a reflective liquid crystal display device exhibiting high brightness, good color characteristics and an improved contrast ratio with high productivity.

2. Description of Prior Art

In general, liquid crystal displays are divided into a transmissive or reflective liquid crystal display depending on whether it uses an internal or an external light source.

While a transmissive liquid crystal display device uses an internal light source such as a backlight, a reflective liquid crystal display device uses ambient light and thus is affected by the environment. For example, the, brightness of light in an office differs largely from that in the street. Also, the brightness of ambient light in a place can vary during different times of a day.

Because of these limitations of a reflective liquid crystal display device, there has been an urgent need for developing a reflective liquid crystal display that utilizes the external light to the maximum and has an improved contrast ratio. Examples of liquid crystal modes for embodying such reflective liquid crystal displays include a twisted nematic LC mode, a polymer-dispersed LC mode and a guest-host LC mode. Of these, the twisted nematic LC mode is most desirable for practical reasons.

A reflective liquid crystal display using the optical properties of a twisted nematic liquid crystal mode is generally based on the following principle.

Figure 1:
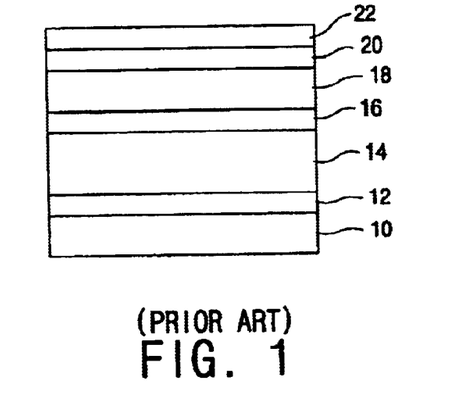
FIG. 1 is a cross-sectional view schematically showing the structure of a conventional reflective liquid crystal display.
Figure 2:
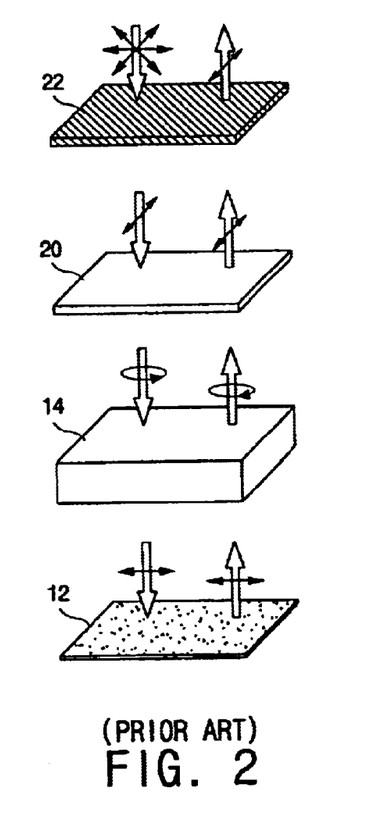
FIG. 2 is a diagrammatic view illustrating the principle of a white display of the conventional reflective liquid crystal display when no voltage is applied.
Figure 3:
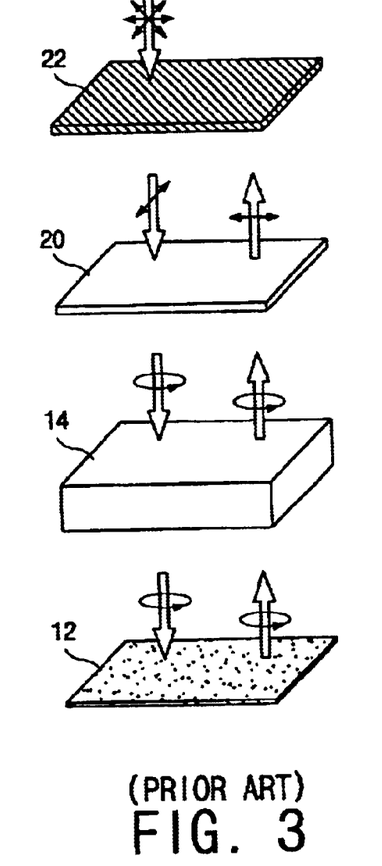
FIG. 3 is a diagrammatic view illustrating the principle of a black display of the conventional reflective liquid crystal display when a voltage is applied.

FIG. 1 is a cross-sectional view showing the structure of a general reflective liquid crystal display device, which is comprised of a twisted nematic (TN) liquid crystal (LC) material 14 sandwiched between a transparent substrate 18 and an opposing substrate 10 having a reflector 12. A common electrode 16 of a transparent metal, positioned between the liquid crystal layer 14 and the transparent substrate 18, applies an electric field on the LC layer 14. On the transparent substrate 18, a retardation film 20 is disposed to convert a linearly polarized light to a circularly polarized light. A linear polarizer 22, which converts natural light to a linearly polarized light, is positioned on the retardation film 20. FIG. 2:1 is a diagrammatic view illustrating transformations of the incident light when no voltage is applied, and FIG. 3 is also a diagrammatic view but illustrating the transformations of the incident light when a voltage is applied.

When no voltage is applied, as shown in FIG. 2, the incident light is converted to a linearly polarized light through the linear polarizer 22, and then converted to a circularly polarized light (assumed to be a left-handed circularly polarized light) through the retardation film 20.

The circularly polarized light then passes through the liquid crystal layer 14 and is converted to a linearly polarized light, then is reflected on the reflector 12.

The reflected light again passes through the liquid crystal layer 14 and is converted to a left-handed circularly polarized light, then after passing through the retardation film 20, the circulary polarized light is: converted to a linearly polarized light parallel to a vertical axis of the linear polarizer.

In contrast, when a voltage is applied as shown in FIG. 3, the incident light is converted to a linearly polarized light through the linear polarizer 22, then to a circularly polarized light (assumed to be a left-handed circularly polarized light) through the retardation film 20.

The light passes through the liquid crystal layer 14 with no change and is reflected on the reflector 12 to become a right-handed circularly polarized light. Then, it passes through the liquid crystal 14 with no change and through the retardation film 20 to become a linearly polarized light parallel to the vertical axis of the linear polarizer. The light is absorbed by the polarizer at this point.

In the above described reflective LCD device, the brightness, contrast ratio and color characteristics depend on the twist angle of the LC layer and on a retardation $d\Delta n$ (where $\Delta n$ is the anisotropy of the refractive index of the LC material, and d is the spacing between substrates.)

U.S. Pat. No. 4,019,807 discloses that for a reflective liquid crystal light valve, an optional optimal twist angle is 45°. For such a twist angle, the maximum liquid crystal mode efficiency (defined later) can be obtained when retardation $d\Delta n$ is about 0.16 μm or 0.38 μm.

However, when $d\Delta n=0.16$ μm, the cell gap is too thin for use in an actual process (making the ease of manufacture or manufacturability poor), whereas when $d\Delta n=0.38$ μm, the yield is good, but the color characteristic, contrast ratio and viewing angle property are not good due to dispersion.

Also, the above property changes greatly with minor variation of $d\Delta n$ (or $d\Delta n$ variation tolerance). Thus, the processing margin of error becomes very small. That is, when the twist angle 45°, minor variation to $d\Delta n$ result in great changes to the above-discussed properties. Thus, applying the 45° twist angle in actual processing becomes difficult.

To mitigate these problems, U.S. Pat. No. Re. 35, 799 discloses that the twist angle and $d\Delta n$ value can be set to 63° and 0.20 μm to obtain a higher reflectance ratio and a better color characteristic, as well as to obtain increased yield due to the increase in cell gap.

The reflective liquid crystal display in the above patent uses the modified twist angle and $d\Delta n$ value for quality improvement. However, the cell gap to meet the $d\Delta n$ of 0.2 μm is still too thin. To achieve satisfactory production using current technique, the cell gap should be 3.0 μm or greater. The $d\Delta n$ value of TN LC material is 0.068. With such a material, the cell gap will be 2.94 μm to achieve $d\Delta n$ of 2.0 μm. This cell gap value is less than the practical limit of 3.0 μm, and thus the yield is likely to be lower than satisfactory.

Another shortcoming of these values is that the voltage applied for a white display mode will be high, leading to a low contrast ratio.

Therefore, there is still the need to modify the twist angle and $d\Delta n$ to assure good yield and a high contrast ratio.

To restate, satisfactory yield in the conventional art have been achieved, but these devices exhibit unsatisfactory display characteristics, e.g., liquid crystal mode efficiencies, and $d\Delta n$ variation tolerances. Conversely, satisfactory liquid mode efficiencies have been achieved in the conventional art, but the yield have been unsatisfactory.

SUMMARY OF THE INVENTION

The invention is, in part, a recognition that a liquid crystal display device can be produced that exhibits satisfactory display characteristics, e.g., liquid crystal mode efficiencies and dΔn variation tolerances, while at the same time exhibit satisfactory yield. This is unexpected given the conventional art.

In order to achieve the objects, the present invention provides, in one aspect, a reflective liquid crystal display device having: first and second substrates spaced apart and facing each other; a twisted nematic liquid crystal layer sandwiched between the two substrates, the liquid crystal layer having a twist angle and birefringence property Δn and having a thickness d; a retardation film: disposed on the first substrate and opposite to the liquid crystal layer, the film converting a first linearly polarized light to a first circularly polarized light and converting a second circularly polarized light to a second linearly polarized light; a linear polarizer disposed on the retardation film and opposite to the liquid crystal layer and converting the incident light to the first linearly polarized light; and a reflector disposed between the liquid crystal layer and the second substrate and reflecting light passed through the liquid crystal layer, wherein an optimized condition comprises a twist angle range between about 65° and 75° with a dΔn in a range between about 0.20 μm and 0.28 μm.

In another aspect, the present invention provides a reflective liquid crystal display device includes: first and second substrates spaced apart and facing each other; a twisted nematic liquid crystal layer sandwiched between the two substrates, the liquid crystal layer having a twist angle and birefringence property Δn and having a thickness d; a retardation film disposed on the first substrate and opposite to the liquid crystal layer, the film converting a first linearly polarized light to a first circularly polarized light and converting a second circularly polarized light to a second linearly polarized light; a linear polarizer disposed on the retardation film and opposite to the liquid crystal layer and converting the incident light to the first linearly polarized light; and a reflector disposed between the liquid crystal layer and the second substrate and reflecting light passed through the liquid crystal layer, wherein an optimized condition comprises a twist angle range between about 75° and 85° with a dΔn in a range between about 0.18 μm and 0.26 μm.

Objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF PREFERRED EMBODIMENT

Below is the detailed description of the preferred embodiments of the invention. The components that are extraneous to the invention are mentioned, but detailed descriptions of those components are omitted.

Figure 4:
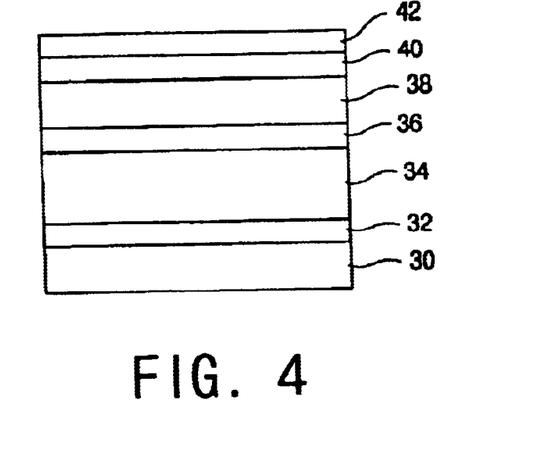
FIG. 4 is a cross-sectional view illustrating the structure of a reflective liquid crystal display according to a preferred embodiment of this invention

FIG. 4 is a cross-sectional view illustrating the structure of a liquid crystal display device of an embodiment of the invention.

First and second substrates 38 and 30 are disposed facing each other with a gap. A reflective electrode 32, which reflects incident light and also the circularity of the light, is formed on the second substrate 30. Between the reflective electrode 32 and the first substrate 38, a liquid crystal layer 34 is disposed to change the phase of the transmitting light.

The reflective electrode 32 also functions as one electrode to apply an electric field to the liquid crystal layer 34, and may have as a rugged surface to control the viewing angle property. Alternatively, it may have a flat surface.

A common electrode 36 is disposed between the first substrate 38 and the liquid crystal layer 34. The common electrode 36 applies an electric field to the liquid crystal layer 34.

A retardation film 40 is formed on the first substrate 38 and a linear polarizer 42 is formed on the retardation film 40. The linear polarizer 42 transforms incident light to linearly polarized light and the retardation film converts the linearly polarized light to a circularly polarized light.

The number of sheets of the retardation film 40 is preferably at least two in order to have an improved retardation property. A retardation film of only one sheet converts a specific wavelength band of light to a circularly polarized light, but light out of the wavelength band becomes distorted. On the other hand, the retardation film having a structure of two or more layers can convert a broader wavelength band of light to a circularly polarized light.

A color filter may be formed on the first or second substrate to produce colored images, and a diffuser may be formed on the first substrate.

For the embodiments of the present invention, simulations have been carried out to optimize the conditions of the liquid crystal layer of a LCD having the above-described structure. The simulation program used is LCD MASTER version 4.3 available from Shin Tech. Co., a Japanese corporation.

Figure 5:
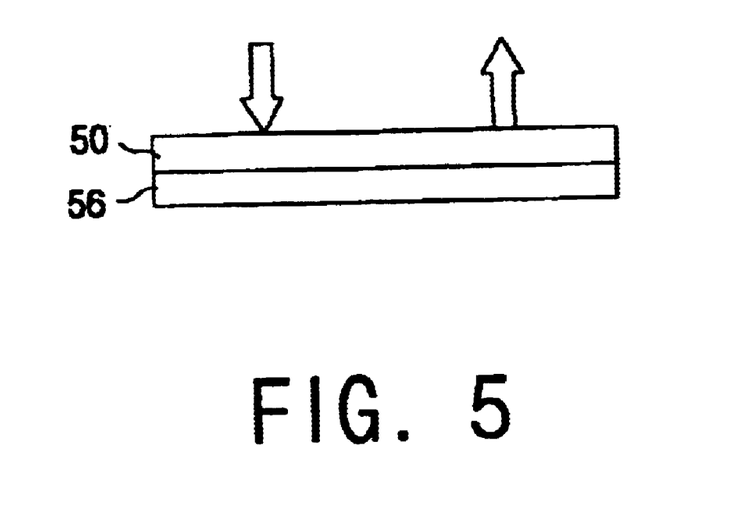
FIG. 5 is a cross-sectional view for explaining the conditions under which the reference reflectance is calculated.

FIG. 5 is a cross-sectional view for illustrating the conditions under which a "reference reflectance" is calculated. As shown, a linear polarizer 50 is formed directly on a reflective plate 56, i.e., there is no liquid crystal layer sandwiched in between the linear polarizer 50 and the reflective plate 56. The reference reflectance is the ratio of the intensity of the reflected light to the intensity of the incident light in such a structure. That is, the reference reflectance is defined as $I_R/I_I$, where $I_R$ represents the intensity of the reflected light and $I_I$ represents the intensity of the incident light in a structure where a linear polarizer is directly formed on a reflective plate.

Figure 6:
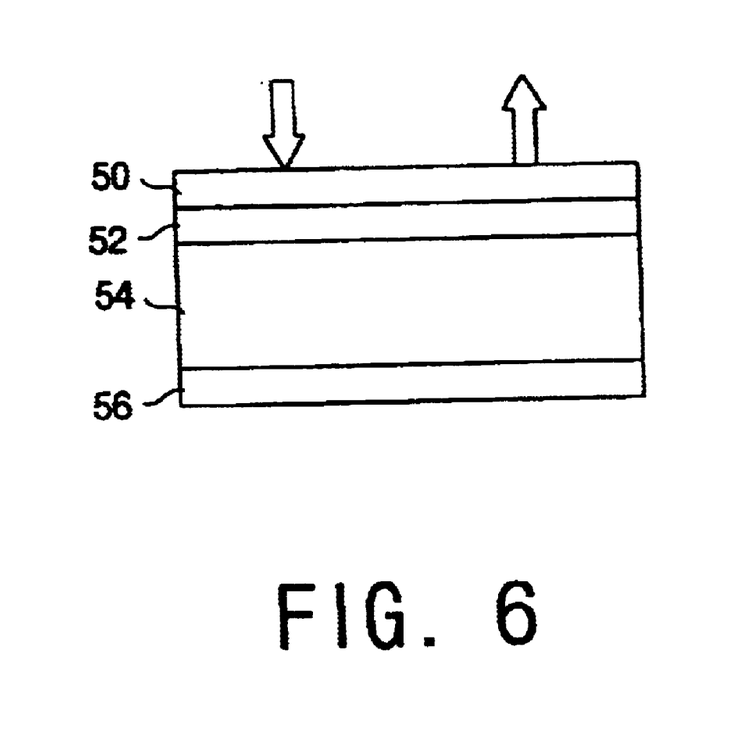
FIG. 6 is a cross-sectional view for explaining the conditions under which a liquid crystal mode efficiency is calculated.

FIG. 6 is a cross-sectional view for illustrating the condition under which the "liquid crystal mode efficiency" is calculated for a structure. To calculate the liquid crystal mode efficiency, a "sample reflectance" must first be determined for the structure.

As shown in FIG. 6, an ideal quarter wave; film 52 and a liquid crystal layer 54 are sandwiched between the linear polarizer 50 and the reflective plate 56. The sample reflectance of this structure is determined from dividing the intensity of reflected light by the intensity of the incident light.

The liquid crystal mode efficiency is simply the ratio between the sample reflectance and the reference reflectance. That is,: the liquid crystal mode efficiency is Sr/Rr, where Sr is the sample reflectance of a structure and Rr is the reference reflectance.

It should be noted that the ideal quarter wave film 52 converts linearly polarized light to circularly polarized light ideally for every wave length.

Figure 7:
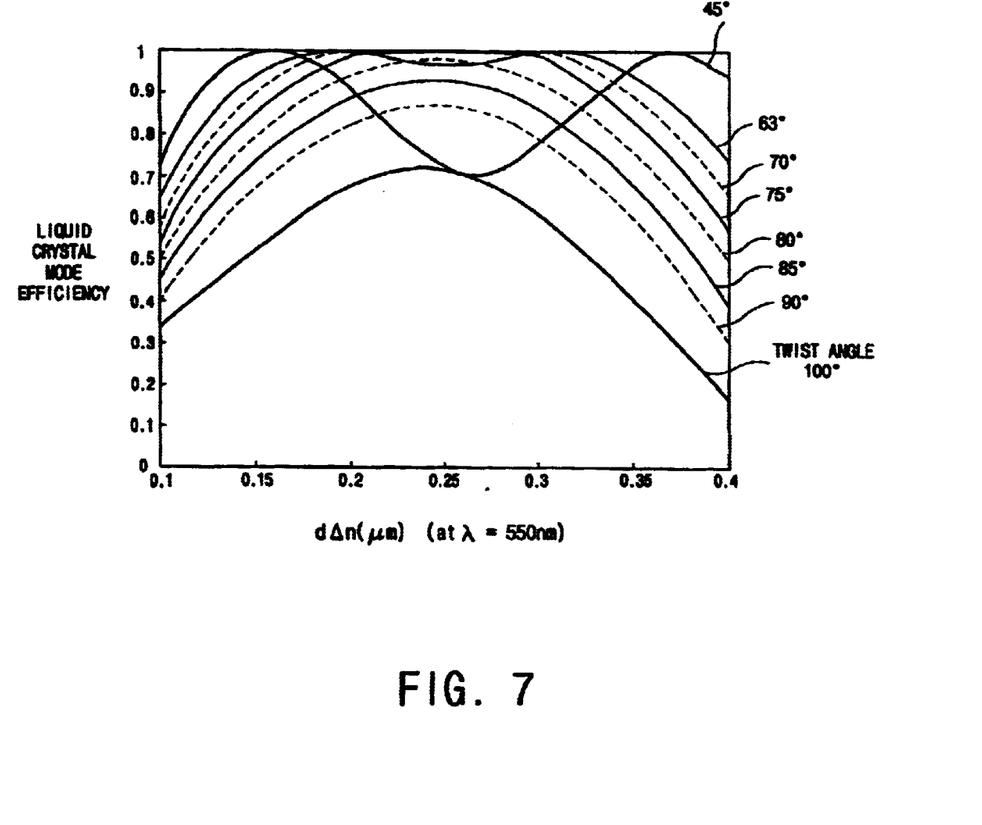
FIG. 7 is a graph of liquid crystal mode efficiencies depending on twist angles and dΔn of liquid crystal layer.

FIG. 7 is a graph illustrating liquid crystal mode efficiencies depending on twist angles and dΔn of a liquid crystal layer. The liquid crystal mode efficiency depending on dΔn is calculated by varying the twist angle of liquid crystal material from 45° to 100°. The dΔn values are based on 550 nm wavelength.

As is illustrated, with a twist angle of 45° as in the conventional art, the liquid crystal mode efficiency is almost 100% at dΔn=0.16 μm and 0.38 μm. At a twist angle of 63° and dΔn=0.2 μm, the liquid crystal mode efficiency is also about 100%. But as explained previously, these conditions have other problems.

It can be seen from the graph that when the twist angle is between 65° and 75°, there is a range of dΔn values for which the liquid crystal mode efficiency is also almost 100%. For example, when the twist angle is 70°, the liquid crystal mode efficiency is also almost 100% if the value of dΔn ranges between 0.21 μm to 0.31 μm.

It can also be seen that when the twist angle is between 75° and 85°, there is a broad range of dΔn values for which the liquid crystal mode efficiency is also above 95%. For example, when the twist angle is 80° and the dΔn ranges from 0.21 μm to 0.29 μm, the liquid crystal mode efficiency is above 95%.

The following first and second embodiments have been established utilizing the results of the above-described studies.

The set up conditions of a liquid crystal layer according to a first embodiment are as follows: a twist angle=65 to 75° and dΔn=0.20 to 0.28 μm; the optimum condition: a twist angle=70° and dΔn=0.24 μm. If a liquid crystal material of Δn=0.068 μm is used, the cell gap becomes 3.53 μm, which will provide satisfactory yields in an actual process.

Now, the effects that such a liquid crystal layer has in a real reflective LCD will be described in comparison with the conventional art. The brightness represents the light reflectance when 0 voltage is applied and the contrast ratio is based on the drive voltage of 5 V.

Figure 8:
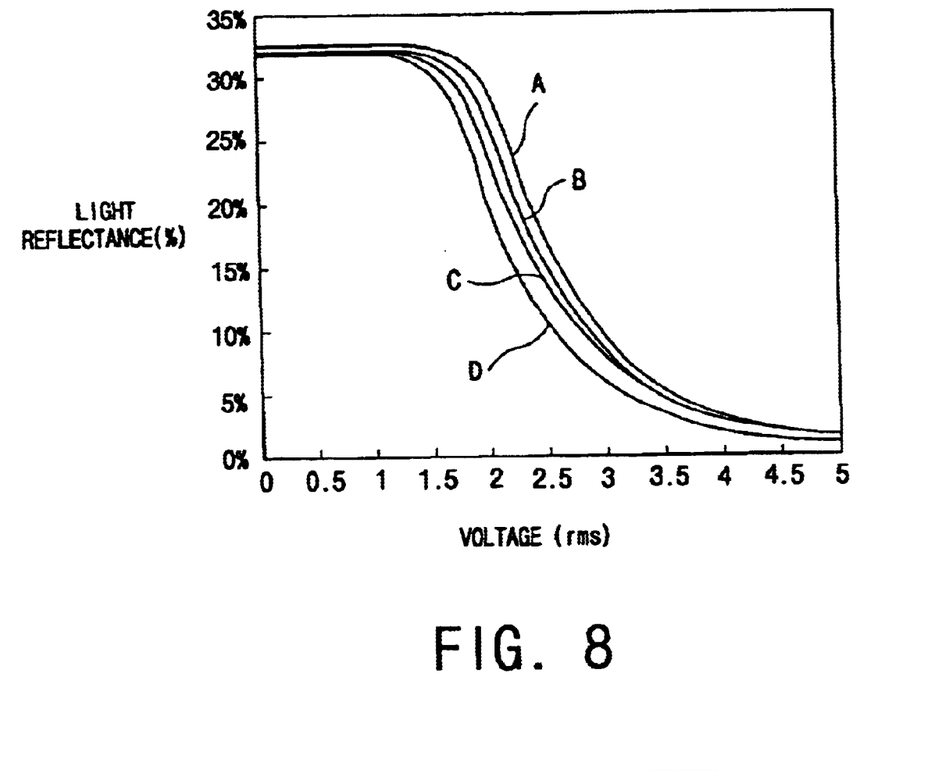
FIG. 8 is a graph illustrating the relationship of light reflectance to a voltage applied to the liquid crystal layer of a reflective LCD according to the embodiment of the invention.

FIG. 8 is a graph illustrating a light reflectance with respect to the voltage applied to liquid crystal layer. Curve A represents the light reflectance when the twist angle=70° and dΔn=0.26 μm; curve B when the :twist angle=70° and dΔn=0.24 μm; curve C when the twist angle=63° and dΔn=0.2 μm as in the conventional art; curve D when the twist angle=70° and dΔn=0.20 μm.

As is illustrated in FIG. 8, curve A has almost the same brightness and contrast ratio as the conventional art but productivity is improved due to the increased dΔn. The curve B has a similar effect as the curve A. The curve D has almost the same reflectance as the conventional art. Also, since its, dΔn is equal to the conventional art, and accordingly no improvement in productivity, is obtained but the contrast ratio is enhanced with curve D.

Therefore, it can be concluded that, with :the first embodiment, the brightness and contrast ratio are similar to those of the conventional art but the increased dΔn enables the enlargement of cell gap leading to improved productivity. Even when the dΔn is the same as the conventional art, the contrast ratio is improved even though the manufacturability may not be increased.

Figure 9:
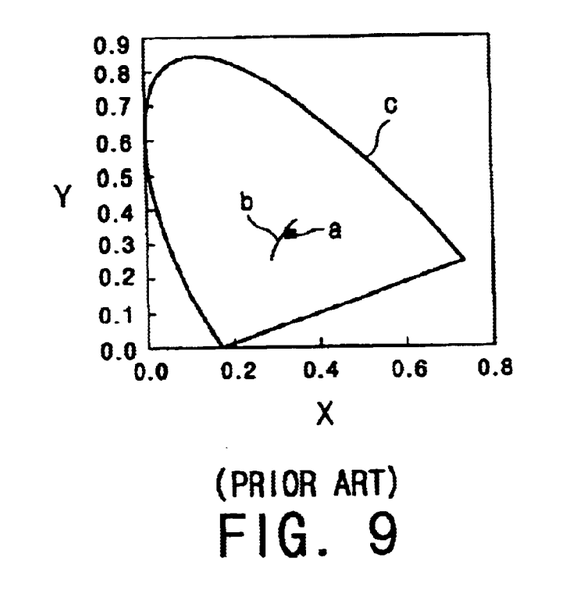
FIG. 9 is a simulation graph illustrating the CIE color coordinates of the conventional reflective LCD.

FIG. 9 is a CIE color coordinate simulation graph plotting x' on the horizontal axis vs. y' on the vertical axis for the conventional: LCD and corresponding backlight of conventional art FIGS. 1–3, as a twisted nematic NW triad RGB LCD. The FIG. 9 graph is based on the Committee Internationale L'Eclair (CIE) tri-stimulus curves and equations (1931) and on CIE 1976 UCS for x', y', and L. The "RGB-area" marks in FIG. 9 represent the red, green, and blue "area" coordinates to be explained later herein, while the corresponding squares represent the light reaching the viewer though that particular pixel (i.e. that particular color filter when a voltage below Vth is applied thereto).

The CIE 1931 color matching equations and CIE tri-stimulus curves were recommended as a standard for colorimetry by Committee Internationale L'Eclair (CIE) in 1931 and have been widely used. The color matching equations are represented as wave functions to express the relative sensitivity according to wavelength and the tri-stimulus values are as follows:

i. $X = \int I(\lambda) x(\lambda) d\lambda$,
ii. $Y = \int I(\lambda) y(\lambda) d\lambda$, and
iii. $Z = \int I(\lambda) z(\lambda) d\lambda$.

For instance, when an object is observed under an arbitrary illumination, the brightness may be varied but the color is the same regardless of the intensity of illumination. The color information, independent of luminosity, is represented by the chromaticity. Information about chromaticity can be expressed by a color coordinates (x, y) of two-dimensional plane using the tri-stimulus values. That is, $$x = \frac{X}{X+Y+Z} \text{ and } y = \frac{Y}{X+Y+Z}$$

The CIE coordinating system comprises the above (x, y) coordinates indicated on CIE 1931 color diagram.

With a standard white light source, the $D_{65}$ corresponding to the chromatic temperature of 6500° K. is usually used.

Now, the color characteristics according to voltage of a liquid crystal display of the first embodiment is described using the CIE color coordinating system, in comparison with the conventional art.

Figure 10:
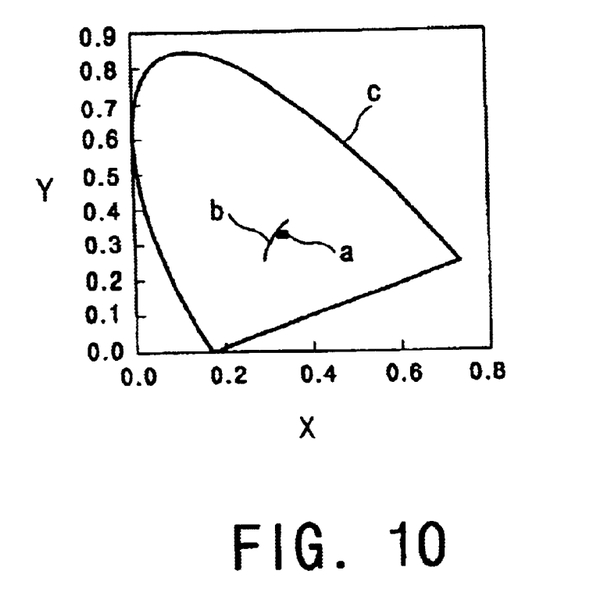
FIGS. 10 and 11 are simulation graphs illustrating the CIE coordinates of a reflective LCD according to the first embodiment of the invention.
Figure 11:
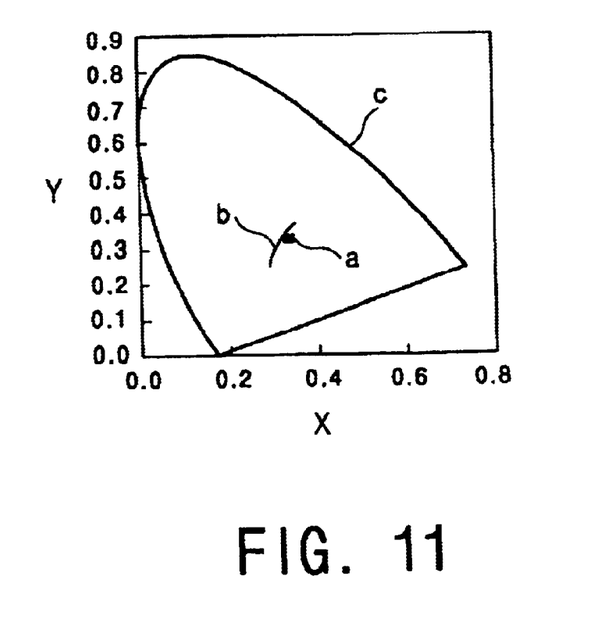

FIG. 9 is a CIE simulation graph plotting x on the horizontal axis vs. y on the vertical axis for the conventional LCD according to voltage. FIGS. 10 and 11 respectively illustrates the color characteristic according to voltage when twist angle=70° and dΔn=0.20 μm and when twist angle=70° and dΔn=0.24 μm as in the first embodiment of the invention.

In the figures, point (a) denotes the above-mentioned standard white light source, a half-ellipse (c) is a CIE color diagram, and curve (b) represents the change of color coordinates according to voltage. In the ideal case, the color coordinates of a liquid crystal display do not change according to voltage from the position coinciding with the color coordinates of the standard white source. That is, the curve (b) becomes a point coincident with (a) in the ideal case.

The simulation result indicates that the color coordinates tend to move toward blue as the voltage increases in both the conventional art and the embodiment of the present invention. It can be evaluated from the figures that a liquid crystal display device of the embodiment of the present invention has better properties in brightness, contrast ratio, color characteristics and productivity compared to the conventional art.

The set up conditions of liquid crystal layer according to the second embodiment are as follows: a twist angle=75 to 85° and dΔn=0.20 to 0.26 μm; the optimum condition: a twist angle=80° and dΔn=0.24 μm. The contrast ratio is much improved at dΔn of 0.24 μm. If a liquid crystal layer of Δn=0.068 μm is used, the cell gap becomes 3.53 μm, which again will yield satisfactory results in an actual process.

Now, the effects that such a liquid crystal material has in a real reflective LCD will be described in comparison with the conventional art.

Figure 12:
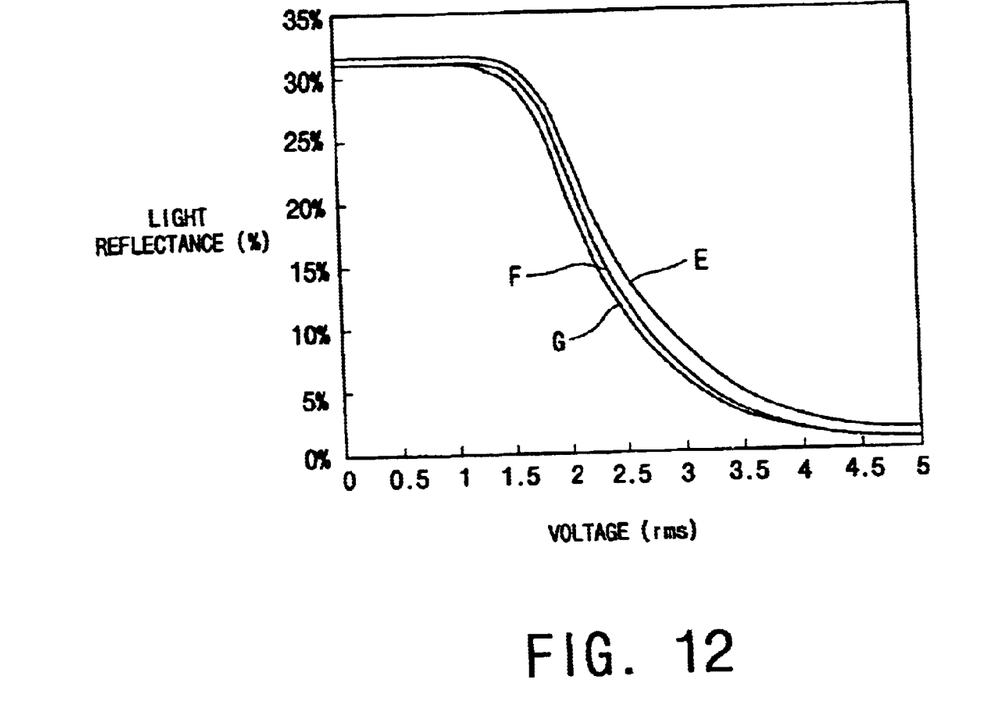
FIG. 12 is a graph illustrating the relations hip of light reflectance to a voltage applied to the liquid crystal layer of a reflective LCD according to the embodiment of the invention.
Figure 13:
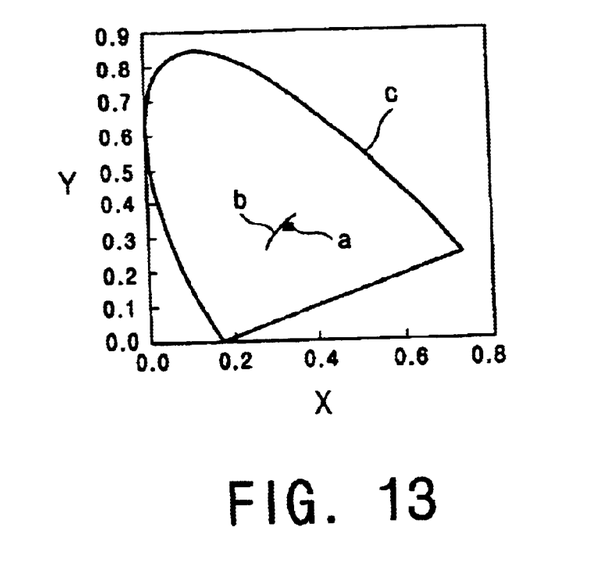
FIG. 13 is a simulation graph illustrating the CIE coordinates of a reflective LCD according to the second embodiment of the invention.

FIG. 12 is a graph illustrating a light reflectance with respect to the voltage applied to the liquid crystal layer of a reflective LCD according to the second embodiment, and FIG. 13 is a graph illustrating the color characteristic according to voltage of the reflective LCD by a CIE color coordinating system.

In FIG. 12, the curve E represents a twist angle of 63° and dΔn of 0.20 μm, curve F a twist angle of 80° and dΔn of 0.26 μm, and curve G a twist angle of 80° and dΔn of 0.24 μm.

If the twist angle is 80° as in curves F and G, the reflectance is slightly decreased. However, both the contrast ratio is improved and the yield is increased due to the enlarged cell gap when compared to a twist angle of 63°. As shown in the CIE coordinating system, the enlarged cell gap does not affect the color characteristic.

The given preferred embodiments and advantages are not intended to limit the invention in any way, and variations and changes thereof apparent to the skilled in the art should be considered to constitute this invention, the spirit and scope of which will be indicated by the accompanying claims.

What is claimed is:

1. A reflective liquid crystal display device, comprising:
   first and second substrates spaced apart and facing each other;
   a twisted nematic liquid crystal layer sandwiched between the two substrates, the liquid crystal layer having a twist angle and birefringence property Δn and having a thickness d;
   a retardation film disposed on the first substrate,
   a linear polarizer disposed on the retardation film and converting an incident light to a linearly polarized light; and
   a reflector disposed between the liquid crystal layer and the second substrate and reflecting light passed through the liquid crystal layer,
   wherein said twist angle is in a range between above 65° and 75° and a product dΔn is in a range between about 0.20 μm and 0.28 μm.

2. The reflective liquid crystal display device of claim 1, wherein the retardation film has at least two layers.

3. The reflective liquid crystal display device of claim 1, wherein the reflector has a flat surface.

4. The liquid crystal display device of claim 1, wherein said twist angle and said dΔn of said liquid crystal layer substantially are 70° and 0.24 μm, respectively.

5. A reflective liquid crystal display device, comprising:
   first and second substrates spaced apart and facing each other;
   a twisted nematic liquid crystal layer sandwiched between the two substrates, the liquid crystal layer having a twist angle and birefringence property Δn and having a thickness d;
   a retardation film disposed on the first substrate,
   a linear polarizer disposed on the retardation film and converting an incident light to a linearly polarized light; and
   a reflector disposed between the liquid crystal layer and the second substrate and reflecting light passed through the liquid crystal layer,
   wherein said twist angle is in a range between about 75° and 85° and a product dΔn is in a range between about 0.2 μm and 0.26 μm.

6. The reflective liquid crystal display device of claim 5, wherein the retardation film has at least two layers.

7. The reflective liquid crystal display device of claim 5, wherein the reflector has a flat surface.

8. A liquid crystal display device, comprising:
   a first substrate;
   a common electrode disposed below said substrate;
   a liquid crystal layer disposed below said common electrode, said liquid crystal layer having a twist angle substantially ranging from above 65° to 75° and a dΔn substantially ranging from 0.20 μm and 0.28 μm;
   a reflective electrode disposed below said liquid crystal layer; and
   a second substrate disposed below said reflective electrode.

9. The liquid crystal display device of claim 8, wherein said twist angle and said dΔn of said liquid crystal layer substantially are 70° and 0.24 μm, respectively.

10. The liquid crystal display device of claim 8, wherein said liquid crystal layer is a twisted nematic liquid crystal material.

11. The liquid crystal display device of claim 8, wherein said reflective electrode has a rugged surface.

12. The liquid crystal display device of claim 8, wherein said reflective electrode has a flat surface.

13. The liquid crystal display device of claim 8, wherein further comprising:
   a retardation film disposed above said first substrate; and
   a linear polarizer disposed above said retardation film.

14. The liquid crystal display device of claim 13, wherein said retardation film is composed of two or more sheets.

15. A liquid crystal display device, comprising:

a first substrate;

a common electrode disposed below said substrate;

a liquid crystal layer disposed below said common electrode, said liquid crystal layer having a twist angle substantially ranging from 75° to 85° and a dΔn substantially ranging from 0.20 μm and 0.26 μm;

a reflective electrode disposed below said liquid crystal layer; and a second substrate disposed below said reflective electrode.

16. The liquid crystal display device of 15, wherein said twist angle and said dΔn of said liquid crystal layer substantially are 80° and 0.24 μm, respectively.

17. The liquid crystal display device of claim 15, wherein said liquid crystal layer is a twisted nematic liquid crystal material.

18. The liquid crystal display device of claim 15, wherein said reflective electrode has a rugged surface.

19. The liquid crystal display device of claim 15, wherein said reflective electrode has a flat surface.

20. The liquid crystal display device of 15, further comprising:

a retardation film disposed above said first substrate; and a linear polarizer disposed above said retardation film.

21. The liquid crystal display device of claim 20, wherein said retardation film is composed of two or more sheets.

* * * * *

UNITED STATES PATENT AND TRADEMARK OFFICE
CERTIFICATE OF CORRECTION

PATENT NO. : 6,654,093 B1  
APPLICATION NO. : 09/571276  
DATED : November 25, 2003  
INVENTOR(S) : Woohyun Kim Page 1 of 1

It is certified that error appears in the above-identified patent and that said Letters Patent is hereby corrected as shown below:

On title page Item [76]  
Please add the following Inventor  
--Hyeon Ho Son--

Signed and Sealed this

Eighth Day of May, 2007

JON W. DUDAS  
*Director of the United States Patent and Trademark Office*